United States Patent
Chun et al.

(10) Patent No.: US 10,508,243 B2
(45) Date of Patent: Dec. 17, 2019

(54) METHOD OF MANUFACTURING IRON-BASE CATALYSTS AND METHODS OF MANUFACTURING HYDROCARBONS USING IRON-BASE CATALYSTS MADE BY THE METHOD

(71) Applicant: KOREA INSTITUTE OF ENERGY RESEARCH, Daejeon (KR)

(72) Inventors: Dong Hyun Chun, Daejeon (KR); Heon Jung, Daejeon (KR); Sung Jun Hong, Daejeon (KR); Ji Chan Park, Daejeon (KR); Ho Tae Lee, Daejeon (KR); Jung Il Yang, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 15/568,538

(22) PCT Filed: Apr. 22, 2016

(86) PCT No.: PCT/KR2016/004246
§ 371 (c)(1),
(2) Date: Oct. 23, 2017

(87) PCT Pub. No.: WO2016/171516
PCT Pub. Date: Oct. 27, 2016

(65) Prior Publication Data
US 2018/0112136 A1     Apr. 26, 2018

(30) Foreign Application Priority Data
Apr. 23, 2015   (KR) .................. 10-2015-0057395

(51) Int. Cl.
*B01J 23/94* (2006.01)
*B01J 37/08* (2006.01)
(Continued)

(52) U.S. Cl.
CPC ............... *C10G 2/332* (2013.01); *B01J 8/22* (2013.01); *B01J 21/08* (2013.01); *B01J 23/745* (2013.01);
(Continued)

(58) Field of Classification Search
CPC ........... B01J 23/745; B01J 23/94; B01J 37/08
(Continued)

(56) References Cited

U.S. PATENT DOCUMENTS 5,620,670 A * 4/1997 Benham .................... C01B 3/38
                                                            422/211
8,809,225 B2 * 8/2014 Kharas ..................... B01J 23/06
                                                            502/331
(Continued)

FOREIGN PATENT DOCUMENTS

JP      2011-045874 A    3/2011
KR      10-0933062 B1    12/2009
(Continued)

*Primary Examiner* — Patricia L. Hailey
(74) *Attorney, Agent, or Firm* — Rabin & Berdo, P.C.

(57) ABSTRACT

The present invention relates to a method for producing liquid or solid hydrocarbons from a synthesis gas via Fischer-Tropsch synthesis which does not carry out a separate reduction pre-treatment for catalyst activation. The method for producing liquid or solid hydrocarbons from a synthesis gas using Fischer-Tropsch synthesis according to the present invention comprises: a first step of applying an iron-based catalyst for the Fischer-Tropsch synthesis in which the number of iron atoms in the ferrihydrite phase fraction equals 10 to 100% and the number of iron atoms in the hematite phase fraction equals 0 to 90%, with respect to 100% of the number of the number of iron atoms, to a Fischer-Tropsch synthesis reactor; and a second step of activating the catalyst for the Fischer-Tropsch synthesis by a synthesis gas which is a reactant under the conditions of the Fischer-Tropsch synthesis and carrying out the Fischer-
(Continued)

Tropsch synthesis by means of the activated catalyst for the Fischer-Tropsch synthesis. As such, the present invention is capable of efficiently producing liquid or solid hydrocarbons from a synthesis gas via Fischer-Tropsch synthesis, even without a separate reduction pre-treatment.

12 Claims, 4 Drawing Sheets

(51) Int. Cl.
  *C10G 2/00*   (2006.01)
  *B01J 37/03*   (2006.01)
  *B01J 23/745*   (2006.01)
  *B01J 8/22*   (2006.01)
  *B01J 21/08*   (2006.01)
  *B01J 37/02*   (2006.01)
  *B01J 37/04*   (2006.01)

(52) U.S. Cl.
  CPC ........... *B01J 37/0236* (2013.01); *B01J 37/03* (2013.01); *B01J 37/04* (2013.01); *B01J 37/08* (2013.01); *C10G 2/34* (2013.01); *B01J 2208/003* (2013.01)

(58) Field of Classification Search
  USPC ................... 502/34, 338; 518/719–720, 728
  See application file for complete search history.

(56) References Cited

U.S. PATENT DOCUMENTS

| | | | |
|---|---|---|---|
| 2004/0106517 A1* | 6/2004 | Dlamini | B01J 23/80 502/326 |
| 2009/0069451 A1* | 3/2009 | Demirel | B01J 23/78 518/713 |
| 2011/0301024 A1 | 12/2011 | Terorde et al. | |
| 2012/0029096 A1* | 2/2012 | Crous | B01J 23/78 518/719 |
| 2013/0296448 A1* | 11/2013 | Wright | B01J 23/745 518/728 |
| 2016/0001267 A1* | 1/2016 | Duvenhage | B01J 37/03 518/713 |
| 2016/0045901 A1* | 2/2016 | Chun | B01J 27/22 518/720 |

FOREIGN PATENT DOCUMENTS

| | | |
|---|---|---|
| KR | 10-2011-0116111 A | 10/2011 |
| KR | 1-2011-0138221 A | 12/2011 |
| KR | 10-1483430 B1 | 1/2015 |

* cited by examiner

METHOD OF MANUFACTURING IRON-BASE CATALYSTS AND METHODS OF MANUFACTURING HYDROCARBONS USING IRON-BASE CATALYSTS MADE BY THE METHOD

TECHNICAL FIELD

The present invention relates to a method for producing liquid or solid hydrocarbons from synthesis gas via Fischer-Tropsch synthesis which does not carry out separate reduction pre-treatment for catalyst activation, and a catalyst for said method and a method for producing said catalyst.

BACKGROUND ART

The Fischer-Tropsch synthesis reaction began in 1923 when German chemists Fischer and Tropsch developed a technique for producing synthetic fuels from synthesis gas by coal gasification. The Fischer-Tropsch synthesis reaction is a reaction wherein a synthesis gas is converted into a hydrocarbon by using a catalyst, and the catalyst used herein is that the higher selectivity of catalyst is the higher productivity of hydrocarbons having 5 or more carbon atoms, which is an index of general productivity, can be increased, thereby increasing the overall carbon efficiency.

As a material showing activity in the Fischer-Tropsch synthesis reaction, a group VIII metal material such as iron (Fe), cobalt (Co), nickel (Ni) and ruthenium (Ru) has been reported. Among them, iron (Fe) based catalysts are especially advantageous for the Fischer-Tropsch synthesis reaction associated with indirect coal liquefaction because of their low production cost, excellent performance, and activity in water-gas shift (WGS) reaction.

In Fe-based catalysts for FT synthesis reaction, Fe-based carbides such as $\varepsilon'$-$F_{2.2}C$ and $\chi$-$Fe_{2.5}C$ are known as active species. However, since the Fe-based catalyst immediately after the production is mostly composed of Fe-based oxides, activation pre-treatment must be performed using a reducing gas including CO prior to the FT synthesis reaction.

In general, iron-based oxide catalysts are well-reduced in a reducing gas composed of CO regardless of pressure, but are not easily reduced in a high-pressure synthesis gas environment such as a Fischer-Tropsch synthesis reaction condition.

In addition, in the Fe-based catalyst, the Fe-based carbide, which is an active species, is highly possible to be re-oxidized and de-carburized by $H_2O$ and $CO_2$ generated as byproducts during the FT synthesis reaction, development of highly reducible and highly carburizable catalysts is very important.

SUMMARY OF INVENTION

Technical Problem

An objective of the present invention is to provide a method for manufacturing a catalyst for Fischer-Tropsch synthesis which has a high reducibility and a high carburizability and does not require a separate reduction pre-treatment, a catalyst manufactured therefrom, and a method for performing Fischer-Tropsch synthesis reaction without a separate catalyst reduction pre-treatment by using the catalyst.

Solution to Problem

A first aspect of the present invention is to provide a method for producing liquid hydrocarbons from a synthesis gas via Fischer-Tropsch synthesis reaction, wherein the method comprises the steps of: a first step of applying an iron-based catalyst for the Fischer-Tropsch synthesis wherein the number of iron atoms in the ferrihydrite phase fraction equals 10 to 100% and the number of iron atoms in the hematite phase fraction equals 0 to 90%, with respect to 100% of the number of iron atoms, to a Fischer-Tropsch synthesis reactor; and a second step of activating the catalyst for the Fischer-Tropsch synthesis by a synthesis gas which is a reactant under the conditions of the Fischer-Tropsch synthesis reaction and carrying out the Fischer-Tropsch synthesis reaction by means of the activated catalyst for the Fischer-Tropsch synthesis.

A second aspect of the present invention is to provide a method for producing an iron-based catalyst from a first precursor comprising a combination of ferrihydrite or ferrihydrite/goethite, wherein the method for producing an iron-based catalyst characterized in that 10 to 100% of the number of iron atoms are contained in the ferrihydrite and 0 to 90% of the number of iron atoms are contained in the goethite with respect to 100% of the number of iron atoms contained in the first precursor.

A third aspect of the present invention is to provide an iron-based catalyst, and the iron-based catalyst comprises a partially hydrated iron hydroxide, wherein the number of iron atoms contained in the partially hydrated iron hydroxide is 10 to 100% with respect to 100% of the number of iron atoms contained in the iron-based catalyst, a crystallite size of the partially hydrated iron hydroxide is 2 to 7 nm, and the partially hydrated iron hydroxide is a super-magnetic substance.

Hereinafter, the present invention will be described in detail.

In the present invention, if an iron-based catalyst for Fischer-Tropsch synthesis wherein the number of iron atoms in the ferrihydrite phase fraction is 10 to 100% and the number of iron atoms in the hematite phase fraction is 0 to 90% with respect to 100% of total iron atoms is used, the iron-based catalyst for Fischer-Tropsch synthesis can be activated by synthesis gas, which is a reactant, even at high pressures (1.0 to 3.0 MPa) such as reaction conditions of Fischer-Tropsch synthesis, and thus, it has been found for the first time that a Fischer-Tropsch synthesis reaction can be carried out without any separate catalytic activation process using pure CO or low pressure (from atmospheric pressure to 0.5 MPa) synthesis gas, with an iron-based catalyst being activated in the reaction condition of Fischer-Tropsch synthesis. The present invention is based on this.

As described above, a method for producing liquid hydrocarbons from synthesis gas using Fischer-Tropsch synthesis reaction according to the present invention may comprise the steps of:

a first step of applying an iron-based catalyst for the Fischer-Tropsch synthesis wherein the number of iron atoms in the ferrihydrite phase fraction equals 10 to 100% and the number of iron atoms in the hematite phase fraction equals 0 to 90%, with respect to 100% of the number of iron atoms, to a Fischer-Tropsch synthesis reactor; and a second step of activating the iron-based catalyst for the Fischer-Tropsch synthesis by a synthesis gas which is a reactant under the conditions of the Fischer-Tropsch synthesis reaction and carrying out the Fischer-Tropsch synthesis reaction over the activated catalyst.

The first step is a step wherein an iron-based catalyst for Fischer-Tropsch synthesis which can be activated by synthesis gas, which is a reactant, even at high pressures such as Fischer-Tropsch synthesis reaction conditions, and wherein the number of iron atoms in the ferrihydrite phase fraction equals 10 to 100% and the number of iron atoms in the hematite phase fraction equals 0 to 90%, with respect to 100% of the number of total iron atoms, is applied to a Fischer-Tropsch synthesis reactor.

In general, there are fixed bed reactors, slurry bubble column reactors (SBCR), and fluidized bed reactors for Fischer-Tropsch synthesis. Two types of reactors currently commercialized are fixed bed reactors and slurry bubble column reactors. As a Fischer-Tropsch synthesis reactor, the slurry bubble column reactor has higher heat transfer efficiency than the fixed bed reactor and has no pressure drop and temperature gradient along the axial direction of the reactor (that is, no hot spot). Also, it is advantageous in that not only it is possible to add/discharge and regenerate the catalyst during operation but also it is possible to design a FT reactor having a larger capacity than that of a fixed bed reactor.

The term ferrihydrite used in the present invention may mean an iron-based compound expressed as a general formula of $FeOOH.nH_2O$ (0<n<1) as a partially hydrated iron oxy-hydroxide. That is, ferrihydrite can be collectively referred to as partially hydrated iron hydroxide, having less than 1 mole of water molecule per one mole of iron atom. Specifically, the ferrihydrite may be represented by a chemical formula such as $Fe_5O_7(OH).4H_2O$, $(Fe^{3+})_2O_3.0.5H_2O$, $Fe_9O_2(OH)_{23}$, $5Fe_2O_3.9H_2O$, $Fe_5HO_8.4H_2O$, and $Fe_2O_3.2FeOOH.2.6H_2O$ and the like. These formula are essentially equivalent and can be converted to the general formula $FeOOH.nH_2O$ (0<n<1) as described above.

The term hematite used in the present invention may mean an iron-based compound represented by a general formula of $\alpha\text{-}Fe_2O_3$ as one of iron oxides. Hematite can be crystallized into a rhombohedral lattice system, and goethite (general formula: $\alpha\text{-}FeOOH$), which is one of the iron oxy-hydroxides of iron, may be converted to hematite through oxidation.

The second step is a step wherein an iron-based catalyst for Fischer-Tropsch synthesis is activated under a high-pressure reaction condition of Fischer-Tropsch synthesis, and the Fischer-Tropsch synthesis reaction is performed over the catalyst activated under the high-pressure reaction condition of Fischer-Tropsch synthesis.

In a method for producing liquid hydrocarbons from synthesis gas using Fischer-Tropsch synthesis reaction according to the present invention, in the first step, an iron-based catalyst wherein the number of iron atoms in the ferrihydrite phase fraction equals 10 to 100% and the number of iron atoms in the hematite phase fraction equals 0 to 90%, with respect to 100% of the number of total iron atoms, is applied to a Fischer-Tropsch synthesis reactor, and thereafter in the second step, because the iron-based catalyst is readily reduced in a high-pressure synthesis gas atmosphere like the reaction condition of Fischer-Tropsch synthesis, and the Fischer-Tropsch synthesis reaction can be carried out immediately without any separate activation pre-treatment in pure CO or low pressure (from atmospheric pressure to 0.5 MPa) synthesis gas by activating the catalyst in a high-pressure synthesis gas. Therefore, there is an advantage that the process can be carried out simply.

The catalytic performance of ferrihydrite is superior to that of hematite in Fischer-Tropsch synthesis, and in the present invention, specific phase fractions of ferrihydrite exist wherein the catalyst shows such superior catalytic performance, and as a result, Fischer-Tropsch synthesis can be efficiently carried out without separate activation pre-treatment.

The reaction pressure during the activation of the iron-based catalyst may be the same as the reaction pressure for the Fischer-Tropsch synthesis. Preferably, the reaction pressure in the second step may be 1 to 3 MPa. In addition to the reaction pressure, the reaction temperature and space velocity may be the same during activation and during Fischer-Tropsch synthesis. Preferably, the second step can be carried out at a reaction temperature of 240 to 300° C. and a space velocity of 2 to 20 $NL/g_{(cat)}/h$.

Preferably, the synthesis gas within $H_2/CO$ ratios adjusted from 0.7 to 2.5 may be used. Preferably, a synthesis gas additionally containing $CO_2$ wherein the volume fraction of $CO_2$ is 0.1 to 20% with reference to the total synthesis gas volume may be used.

In addition, as described above, in the present invention, as a method for producing an iron-based catalyst wherein the iron-based catalyst is readily reduced in a high-pressure synthesis gas atmosphere so that the Fischer-Tropsch synthesis reaction can be carried out immediately without any separate activation pre-treatment in low pressure, with an iron-based catalyst being activated in a high-pressure synthesis gas and wherein the iron-based catalyst is also produced from the first precursor composed of a ferrihydrite or a combination of ferrihydrite/goethite, and at this time, contains 10 to 100% of the number of iron atoms contained in the ferrihydrite and 0 to 90% of the number of iron atoms contained in the goethite with respect to 100% of the number of total iron atoms contained in the first precursor, a method for producing an iron-based catalyst may be provided.

As one of preferred aspects, a method for producing an iron-based catalyst according to the present invention may comprise the steps of:

a) a step of selecting a precipitation time to obtain a desired fraction of the ferrihydrite and goethite in the first precursor prepared by the precipitation method; and b) a step of preparing a first precursor with a desired fraction of ferrihydrite and goethite under a precipitation time selected in the above step through a precipitation method.

In addition, a method for producing an iron-based catalyst according to the present invention may further comprise the steps of:

c) a step of mixing the first precursor with silica; and d) a step of drying and calcining the first precursor mixed with silica.

The step a) is a step of selecting a precipitation time as a parameter for obtaining a desired fraction of ferrihydrite and goethite in the first precursor.

The term "precipitation time" used in the present invention may mean a time for inducing precipitation by adding a precipitating agent to an aqueous solution of a metal salt, a source of the first precursor, and the precipitation time can be controlled by controlling the addition rate of the precipitant.

In the present invention, when the precipitating agent is added to the aqueous solution of the metal salt to obtain the first precursor, the fractions of ferrihydrite and goethite in the first precursor can be controlled by adjusting the time for adding the precipitant with a certain range, and in this way, by controlling the fractions of ferrihydrite and goethite, we found that we can obtain iron-based catalysts composed of ferrihydrite and hematite with desired fractions as goethite can be converted to hematite in the subsequent calcination process. The transformation of goethite to hematite can occur as shown in Reaction Formula 1 below, and meso-sized pores can be formed as water is generated during conversion.

Reaction Formula 1]

The precipitation time selected in step a) may be 20 minutes to 20 hours.

Specifically, in the present invention, when the precipitation time was adjusted to 20 minutes, 80 minutes, and 5 hours, the Fischer-Tropsch synthesis reaction can be performed without separate activation pre-treatment at the same performance level as that in the case where the activation pre-treatment was performed (Example 8, Example 1 and Example 7). However, when the precipitation time exceeded 20 hours, the catalyst shows low CO conversion and low productivity of $C_{5+}$ unless a separate activation pre-treatment was performed (Comparative Example 1 and Comparative Example 2).

Thereafter, in step b), a first precursor with a desired fraction of ferrihydrite and goethite under the precipitation time selected in step a) is prepared by precipitation.

As for one of preferred aspects of an exemplary embodiment, the step b) may be performed by mixing an aqueous solution of iron salt and an aqueous solution of a metal salt selected from the group consisting of copper, cobalt, manganese or a combination thereof, and then adding a basic aqueous solution to the mixed solution until the pH reaches 7 to 9 at a temperature of 75 to 85° C. for 20 minutes to 20 hours.

As the salt of iron and the salt of the metal selected from the group consisting of copper, cobalt, manganese or a combination thereof, nitrate, sulfate and the like can be used, and preferably, as the salt of iron, a salt compound of trivalent iron can be used.

The basic aqueous solution serves as a precipitating agent, and for example, an aqueous solution of sodium carbonate can be used.

The step c) is a step of mixing the first precursor produced in the step b) with silica, which is a structural promoter capable of acting as a support.

Figure 3:
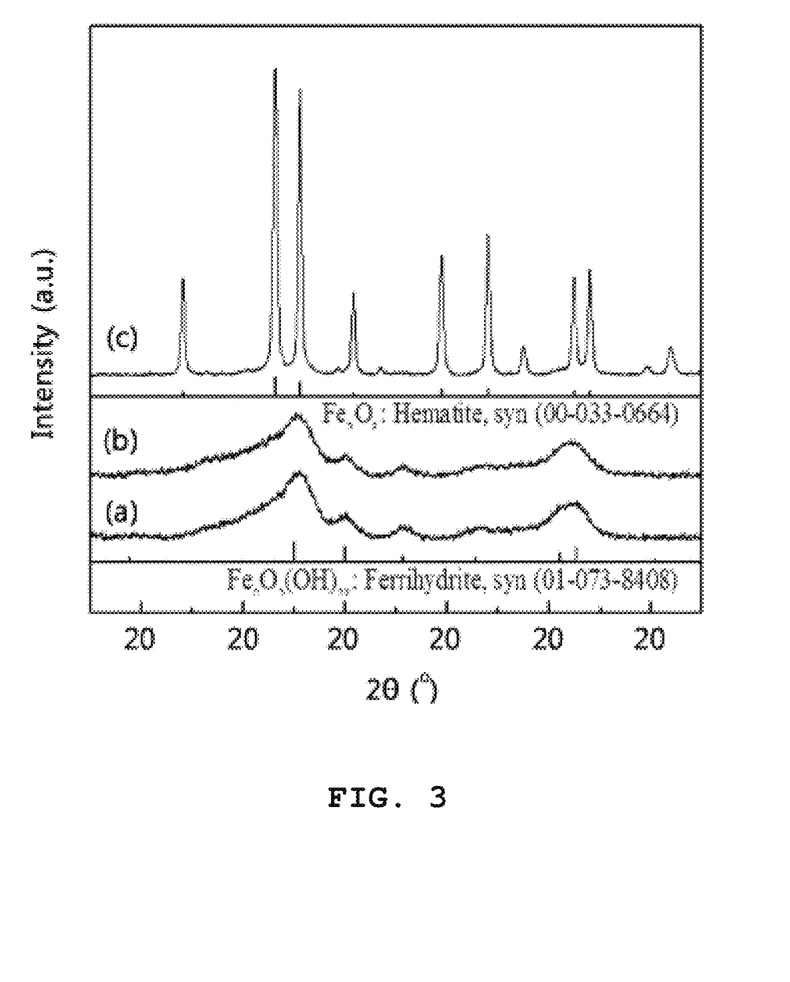
FIG. 3 shows the results of XRD analysis of (a) the first precursor of Example 13 and Comparative Example 8, (b) the catalyst of Example 13, and (c) the catalyst of Comparative Example 8.

In the present invention, the use of silica ($SiO_2$) as the structural promoter enables the ferrihydrite in the first precursor to be maintained in the ferrihydrite phase without being converted into an iron oxide, hematite, in the subsequent calcination process. Ferrihydrite has low thermal stability and can be easily decomposed into hematite during the calcination process as shown in Reaction Formula 2 (FIG. 3).

Reaction Formula 2]

However, in the present invention, it has been confirmed that the use of silica ($SiO_2$) as the structural promoter enables the ferrihydrite phase to be maintained even after calcining. Further, in the present invention, it was confirmed that it is difficult to maintain the phase of ferrihydrite in the case of using a structural promoter other than silica as the structural promoter.

Specifically, in an example of the present invention, in the case of using the silica as the structural promoter, the fraction of the phase of ferrihydrite was maintained (Example 1). However, as the structural promoter, a material other than silica such as alumina ($Al_2O_3$) or zirconia ($ZrO_2$) is used, or when the structural promoter itself was not used, it was confirmed that the ferrihydrite was converted into hematite (Comparative Examples 3 to 5).

Preferably, the mass ratio of iron (Fe) to silica ($SiO_2$) may be Fe:$SiO_2$=100:11 to 100:27. If the mass ratio of the silica ($SiO_2$) is out of the above range, the catalyst may show low CO conversion and low productivity of $C_{5+}$ (Comparative Examples 6 and 7).

As for one of preferred aspects of an exemplary embodiment, the step c) can be performed by adding silica or a silica precursor to the slurry containing the first precursor.

In the present invention, the silica may be fumed silica or colloidal silica, and the silica precursor may be potassium silicate, but is not limited thereto.

Preferably, a step of washing the slurry containing the first precursor may be added prior to step c). At this time, the washing may be carried out using water.

Preferably, in step c), in addition to the silica or the silica precursor, an aqueous solution of at least one metal salt selected from the group consisting of an alkali metal and an alkaline earth metal, or a precursor substance thereof may be further added to the slurry containing the first precursor. Specifically, in the example of the present invention, an aqueous solution of potassium carbonate was further added.

The step d) is a step of drying and calcining the first precursor mixed with silica so as to convert goethite within the first precursor to hematite.

As for an aspect of a preferred exemplary embodiment, step d) can be performed by drying the first precursor mixed with silica and calcining the first precursor mixed with silica in an atmospheric environment at 300 to 600° C., preferably 300 to 450° C. for 1 to 8 hours. If the calcination temperature is less than 300° C., the effect of strengthening the physical strength of the catalyst by silica serving as a support and structural promoter may be insufficient, and if the calcination temperature is higher than 600° C., the entire ferrihydrate is decomposed into hematite, therefore the phase fraction can be out of optimal value. If the calcination time is less than 1 hour, the effect of strengthening the physical strength of the catalyst by silica may be insignificant, and if the calcination time is more than 8 hours, the effect of the increase in time may be insignificant and may not be economical.

The drying may be performed by a spray drying method or a rotary evaporation method.

According to an iron-based catalyst produced by a method of producing iron-based catalyst in the present invention, as previously described, the first precursor is adjusted so that 10 to 100% of the number of iron atoms is contained in the ferrihydrite and 0 to 90% of the number of iron atoms is contained in the goethite with respect to 100% of the number of iron atoms contained in the first precursor, and thereby an iron-based catalyst wherein the number of iron atoms is 10 to 100% of the phase fraction of ferrihydrite and the number of iron atoms is 0 to 90% of a hematite phase fraction with respect to 100% of the total iron atoms can be produced, therefore, it is possible to perform the Fischer-Tropsch synthesis reaction without any separate activation pre-treatment.

Further, the present invention is an iron-based catalyst capable of performing a Fischer-Tropsch synthesis reaction without any separate activation pre-treatment, and as previously described, an iron-based catalyst comprising a partially hydrated iron hydroxide may be provided, wherein the iron atom contained in the partially hydrated iron hydroxide is 10 to 100% with respect to 100% iron atoms contained in the iron-based catalyst, wherein the crystallite size of the partially hydrated iron hydroxide is 2 to 7 nm, and wherein the partially hydrated iron hydroxide is a super-magnetic substance. The partially hydrated iron hydroxide may be ferrihydrite.

The iron-based catalyst has a small crystallite size of 2 to 7 nm (FIG. 3). Since ferrihydrite having a reduction starting temperature of 100° C. or less forms the main phase, the reducibility is excellent in the synthesis gas atmosphere regardless of the pressure, so that it has the advantage of enabling Fischer-Tropsch synthesis reaction without and extra activation pre-treatment.

Advantageous Effects of Invention

The catalyst according to the present invention is composed of a ferrihydrite or a combination of ferrihydrite/hematite, and contains 10 to 100% of the number of iron atoms contained in the ferrihydrite and 0 to 90% of the number of iron atoms contained in the hematite, with respect to 100% of the number of iron atoms, and the iron-based catalyst is advantageous in that it can be directly used to a Fischer-Tropsch synthesis reaction without performing a reduction pre-treatment.

DETAILED DESCRIPTION OF EXAMPLE

Hereinafter, the present invention will be described in more detail with reference to examples. However, these examples are for illustrative purposes only, and the scope of the present invention is not limited to these examples.

Example 1

A mixed solution is produced by mixing an aqueous solution of iron nitrate ($Fe(NO_3)_3 \cdot 9H_2O$) at concentration of 2 mol and an aqueous solution of copper nitrate ($Cu(NO_3)_2 \cdot 5H_2O$), and an aqueous solution of sodium carbonate ($Na_2CO_3$) at concentration of 2 mol was added to the mixed solution at a temperature of about 80° C. for about 80 minutes until the PH is reached to 8, and thereby, a first precursor composed of a phase fraction of ferrihydrite:goethite=77%:23% with reference to the number of iron atoms contained in each phase in the solid precipitate was obtained. The precipitate slurry containing the first precursor was filtered and washed with distilled water so that the remaining sodium was sufficiently removed, and a second precursor slurry was produced by adding fumed silica ($SiO_2$) and an aqueous solution of potassium carbonate ($K_2CO_3$) to the washed precipitate slurry. The amounts of iron nitrate, copper nitrate, potassium carbonate, and fumed silica were adjusted to be Fe:Cu:K:$SiO_2$=100:5:5:20 by mass ratio. The second precursor slurry was dried by a spray drying method and then calcined in an atmospheric environment of 400° C. for 8 hours, and thereby, an iron-based catalyst composed of a phase fraction ferrihydrite:hematite=82%:18% with reference to the number of iron atoms contained in each phase was obtained.

Example 2

The first precursor and the second precursor slurry were produced in the same manner as in Example 1, and then the second precursor slurry was dried through rotary evaporation (rotary vacuum evaporation), followed by calcining in an atmospheric environment at 400° C. for 8 hours, and thereby an iron-based catalyst having the same phase fraction as in Example 1 was obtained.

Example 3

A first precursor was produced in the same manner as in Example 1. The precipitate slurry containing the first precursor was filtered and washed using distilled water to sufficiently remove residual sodium, and a second precursor slurry was produced by adding fumed silica and an aqueous solution of potassium carbonate to the washed precipitate slurry. The amounts of iron nitrate, copper nitrate, potassium carbonate and fumed silica were adjusted to be Fe:Cu:K:$SiO_2$=100:5:5:13 by mass ratio. The second precursor slurry was dried by a rotary evaporation method and then calcined in an atmospheric environment at 400° C. for 8 hours, and thereby an iron-based catalyst having the same phase fraction as in Example 1 was obtained.

Example 4

A first precursor was produced in the same manner as in Example 1. The precipitate slurry containing the first precursor was filtered and washed using distilled water to sufficiently remove residual sodium, and a second precursor slurry was produced by adding fumed silica and an aqueous solution of potassium carbonate to the washed precipitate slurry. The amounts of iron nitrate, copper nitrate, potassium carbonate, and fumed silica were adjusted to be in the range of Fe:Cu:K:$SiO_2$=100:5:5:25 by mass ratio. The second precursor slurry was dried by a rotary evaporation method and then calcined in an atmospheric environment at 400° C. for 8 hours, and thereby an iron-based catalyst having the same phase fraction as in Example 1 was obtained.

Example 5

A first precursor was produced in the same manner as in Example 1. The precipitate slurry containing the first precursor was filtered and washed with distilled water to sufficiently remove the residual sodium, and a second precursor slurry was produced by adding colloidal silica ($SiO_2$) and an aqueous solution of potassium carbonate to the washed precipitate slurry. The amounts of iron nitrate, copper nitrate, potassium carbonate, and colloidal silica were adjusted to be Fe:Cu:K:$SiO_2$=100:5:5:20 by mass ratio. The second precursor slurry was dried by a rotary evaporation method and then calcined in an atmospheric environment at 400° C. for 8 hours, and thereby an iron-based catalyst having the same phase fraction as in Example 1 was obtained.

Example 6

A first precursor was produced in the same manner as in Example 1. The precipitate slurry containing the first precursor was filtered and washed using distilled water to sufficiently remove residual sodium, and a second precursor slurry was produced by adding an aqueous solution of potassium silicate having a K:SiO$_2$=5:20 by mass ratio to the washed precipitate slurry. A first precursor was produced in the same manner as in Example 1. The amounts of iron nitrate, copper nitrate, and potassium silicate were adjusted to be Fe:Cu:K:SiO$_2$=100:5:5:20 by mass ratio. The second precursor slurry was dried by a spray drying method and then calcined in an atmospheric environment at 400° C. for 8 hours, and thereby an iron-based catalyst having the same phase fraction as in Example 1 was obtained.

Example 7

A mixed solution is produced by mixing an aqueous solution of iron nitrate at concentration of 2 mol and an aqueous solution of copper nitrate, and an aqueous solution of sodium carbonate at concentration of 2 mol was added to the mixed solution at a temperature of about 80° C. for 5.3 hours to reach a pH of 8, and thereby, a first precursor composed of a phase fraction of ferrihydrite:goethite=19%:81% with reference to the number of iron atoms contained in each phase in the solid precipitate was obtained. A second precursor slurry was produced in the same manner as in Example 1 using the first precursor. The second precursor slurry was dried by a spray drying method and then calcined in an atmospheric environment at 400° C. for 8 hours, and thereby, an iron-based catalyst composed of a phase fraction ferrihydrite:hematite=19%:81% with reference to the number of iron atoms contained in each phase was obtained.

Example 8

A mixed solution is produced by mixing an aqueous solution of iron nitrate at concentration of 2 mol and an aqueous solution of copper nitrate, and an aqueous solution of sodium carbonate at concentration of 2 mol was added to the mixed solution at a temperature of about 80° C. for about 20 minutes to reach a pH of 8, and thereby a first precursor containing only ferrihydrite as an iron-based compounds was obtained. The precipitate slurry containing the first precursor was filtered and washed using distilled water to sufficiently remove residual sodium, and a second precursor slurry was produced by adding fumed silica and and an aqueous solution of potassium carbonate to the washed precipitate slurry. The amounts of iron nitrate, copper nitrate, potassium carbonate and fumed silica were adjusted to be Fe:Cu:K:SiO$_2$=100:5:5:13 by mass ratio. The second precursor slurry was dried by a spray drying method and then calcined in an atmospheric atmosphere at 400° C. for 8 hours, and thereby an iron-based catalyst containing only ferrihydrite as an iron-based compound was obtained.

Example 9

A first precursor and a second precursor slurry were produced in the same manner as in Example 1. The second precursor slurry was dried by a rotary evaporation method and then calcined in an atmospheric atmosphere at 450° C. for 8 hours, and thereby an iron-based catalyst having the same phase fraction as in Example 1 was obtained.

Example 10

A first precursor and a second precursor slurry were produced in the same manner as in Example 1. The second precursor slurry was dried by a rotary evaporation method and then calcined in an atmospheric environment at 300° C. for 8 hours, and thereby an iron-based catalyst having the same phase fraction as in Example 1 was obtained.

Example 11

A first precursor and a second precursor slurry were produced in the same manner as in Example 1. The second precursor slurry was dried by a rotary evaporation method and then calcined in an atmospheric environment of 400° C. for 1 hour, and thereby an iron-based catalyst having the same phase fraction as in Example 1 was obtained.

Example 12

A first precursor and a second precursor slurry were produced in the same manner as in Example 1. The second precursor slurry was dried by a rotary evaporation method and then calcined in an atmospheric environment of 400° C. for 2 hours, and thereby an iron-based catalyst having the same phase fraction as in Example 1 was obtained.

Example 13

A first precursor was produced in the same manner as in Example 8. A second precursor slurry was produced in the same manner as in Example 1 using the first precursor. The second precursor slurry was dried by a rotary evaporation method and then calcined in an atmospheric environment at 400° C. for 8 hours, and thereby an iron-based catalyst containing only ferrihydrite as an iron-based compound was obtained.

Example 14

A first precursor was produced in the same manner as in Example 1. The precipitate slurry containing the first precursor was filtered and washed using distilled water to sufficiently remove residual sodium, and a second precursor slurry was produced by adding fumed silica and an aqueous solution of potassium carbonate to the washed precipitate slurry. The amounts of iron nitrate, copper nitrate, potassium carbonate, and fumed silica were adjusted to be Fe:Cu:K:SiO$_2$=100:5:4:16 by mass ratio. The second precursor slurry was dried by a spray drying method and then calcined in an atmospheric environment at 400° C. for 8 hours, and thereby an iron-based catalyst having the same phase fraction as in Example 1 was obtained.

Comparative Example 1

A mixed solution is produced by mixing an aqueous solution of iron nitrate at concentration of 2 mol and an aqueous solution of copper nitrate, and an aqueous solution of sodium carbonate at concentration of 2 mol was added to the mixed solution at a temperature of about 80° C. for 21.3 hours to reach a pH of 8, and thereby a first precursor containing only goethite as an iron-based compound was obtained. A second precursor slurry was produced in the same manner as in Example 1 using the first precursor. The second precursor slurry was dried by a spray drying method and then calcined in an atmospheric environment at 400° C. for 8 hours, and thereby an iron-based catalyst containing only hematite as an iron-based compound was obtained.

Comparative Example 2

A mixed solution is produced by mixing an aqueous solution of iron nitrate at concentration of 0.25 mol and an aqueous solution of copper nitrate, and an aqueous solution of sodium carbonate at concentration of 0.25 mol was added to the mixed solution at a temperature of about 80° C. for 42.7 hours to reach a pH of 8, and thereby a first precursor containing only goethite as an iron-based compound was obtained. A second precursor slurry was produced in the same manner as in Example 3 using the first precursor. The second precursor slurry was dried by a spray drying method and then calcined in an atmospheric environment at 400° C. for 8 hours, and thereby an iron-based catalyst containing only hematite as an iron-based compound was obtained.

Comparative Example 3

A first precursor was produced in the same manner as in Example 1. The precipitate slurry containing the first precursor was filtered and washed with distilled water so that the remaining sodium was sufficiently removed, and a second precursor slurry was produced by adding an aqueous solution of aluminum nitrate ($Al(NO_3)_3 \cdot 9H_2O$) and an aqueous solution of potassium nitrate ($KNO_3$) to the washed precipitate slurry. The amounts of iron nitrate, copper nitrate, potassium nitrate, and aluminum nitrate were adjusted to be $Fe:Cu:K:Al_2O_3=100:5:5:20$ by mass ratio. The second precursor slurry was dried by a rotary evaporation method and then calcined in an atmospheric atmosphere at 400° C. for 8 hours, and thereby an iron-based catalyst containing only hematite as an iron-based compound was obtained.

Comparative Example 4

A first precursor was produced in the same manner as in Example 1. The precipitate slurry containing the first precursor was filtered and washed with distilled water so that the remaining sodium was sufficiently removed, and a second precursor slurry was produced by adding an aqueous solution of zirconium acetate ($Zr^{x+} \cdot xCH_3OOH$) and an aqueous solution of potassium nitrate to the washed precipitate slurry. The amounts of iron nitrate, copper nitrate, potassium nitrate, and zirconium acetate were adjusted to be $Fe:Cu:K:ZrO_2=100:5:5:20$ by mass ratio. The second precursor slurry was dried by a rotary evaporation method and then calcined in an atmospheric atmosphere at 400° C. for 8 hours, and thereby an iron-based catalyst containing only hematite as an iron-based compound was obtained.

Comparative Example 5

A first precursor was produced in the same manner as in Example 1. The precipitate slurry containing the first precursor was filtered and washed with distilled water so that the remaining sodium was sufficiently removed, and a second precursor slurry was produced by adding an aqueous solution of potassium carbonate to the washed precipitate slurry. The amounts of iron nitrate, copper nitrate, and potassium carbonate were adjusted to be $Fe:Cu:K=100:5:5$ by mass ratio. The second precursor slurry was dried by a rotary evaporation method and then calcined in an atmospheric atmosphere at 400° C. for 8 hours, and thereby an iron-based catalyst containing only hematite as an iron-based compound was obtained.

Comparative Example 6

A first precursor was produced in the same manner as in Example 1. The precipitate slurry containing the first precursor was filtered and washed with distilled water so that the remaining sodium was sufficiently removed, and a second precursor slurry was produced by adding fumed silica and an aqueous solution of potassium carbonate to the washed precipitate slurry. The amounts of iron nitrate, copper nitrate, potassium carbonate, and fumed silica were adjusted to be $Fe:Cu:K:SiO_2=100:5:5:6$ by mass ratio. The second precursor slurry was dried by a rotary evaporation method and then calcined in an atmospheric environment at 400° C. for 8 hours, and thereby an iron-based catalyst having the same phase fraction as in Example 1 was obtained.

Comparative Example 7

A first precursor was produced in the same manner as in Example 1. The precipitate slurry containing the first precursor was filtered and washed with distilled water so that the remaining sodium was sufficiently removed, and a second precursor slurry was produced by adding fumed silica and an aqueous solution of potassium carbonate to the washed precipitate slurry. The amounts of iron nitrate, copper nitrate, potassium carbonate, and fumed silica were adjusted to be $Fe:Cu:K:SiO_2=100:5:5:31$ by mass ratio. The second precursor slurry was dried by a spray drying method and then calcined in an atmospheric environment at 400° C. for 8 hours, and thereby an iron-based catalyst having the same phase fraction as in Example 1 was obtained.

Comparative Example 8

A first precursor was produced in the same manner as in Example 8. A second precursor slurry was produced in the same manner as in Comparative Example 5 using the first precursor. The second precursor slurry was dried by a rotary evaporation method and then calcined in an atmospheric atmosphere at 400° C. for 8 hours, and thereby an iron-based catalyst containing only hematite as an iron-based compound was obtained.

Experiment 1: Analysis of Properties of Catalysts as Produced

The phase fractions of the catalysts produced by the methods of Examples 1 to 14 and Comparative Examples 1 to 8 were analyzed by Mossbauer spectroscopy.

Figure 1:
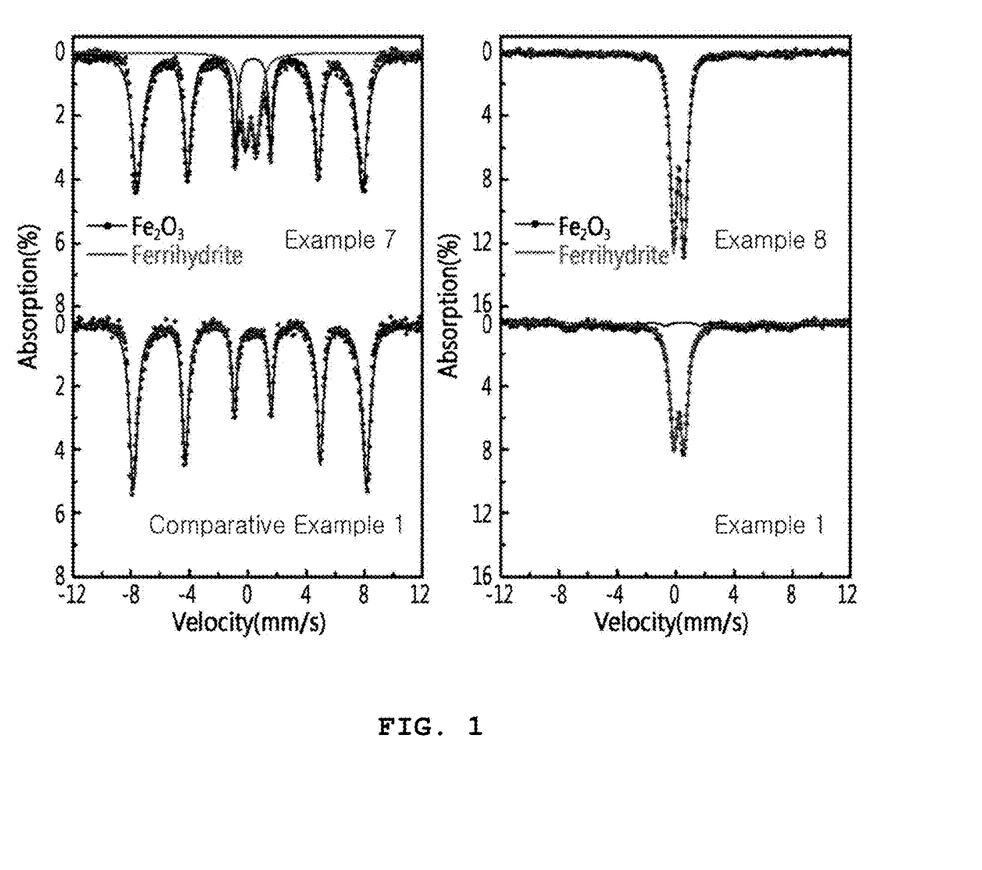
FIG. 1 is a graph showing the Mossbauer spectrum of each iron-based catalyst that derived the results of the phase fraction rates shown in Table 1.

The results are illustrated in FIG. 1, and the phase fraction is calculated based on the results of the Mossbauer spectroscopy of FIG. 1, and thereby the typical results of the phase fractions of Examples 1, 7, and 8 and Comparative Example 1 are shown in Table 1 below.

TABLE 1

|  | Phase fraction (%) | |
| --- | --- | --- |
|  | Ferrihydrite | Hematite |
| Example 1 | 82% | 18% |
| Example 7 | 19% | 81% |
| Example 8 | 100% | 0% |
| Comparative Example 1 | 0% | 100% |

The phase fractions of the catalysts produced by the methods of Examples 2 to 6, Examples 9 to 12, Example 14 and Comparative Examples 6 and 7 were the same as those of Example 1 at the level within the error range of ±5%, and the catalyst produced by the method of Example 13 showed the same values as those of Example 8.

The phase fractions of the catalysts produced by the methods of Comparative Examples 2 to 5 and Comparative Example 8 were the same as those of Comparative Example 1.

From the above results, it is possible to confirm that the catalysts produced by the methods of Examples 1 to 13 are composed of a combination of ferrihydrite and hematite, and a phase fraction of ferrihydrite:hematite=10 to 100%:0 to 90% with respect to the number of iron atoms contained in each phase. On the contrary, it is possible to confirm that the Comparative Examples 1 to 5 and the Comparative Example 8 are composed of 100% of hematite, so that the phase fraction deviates from the above optimum value.

Figure 2:
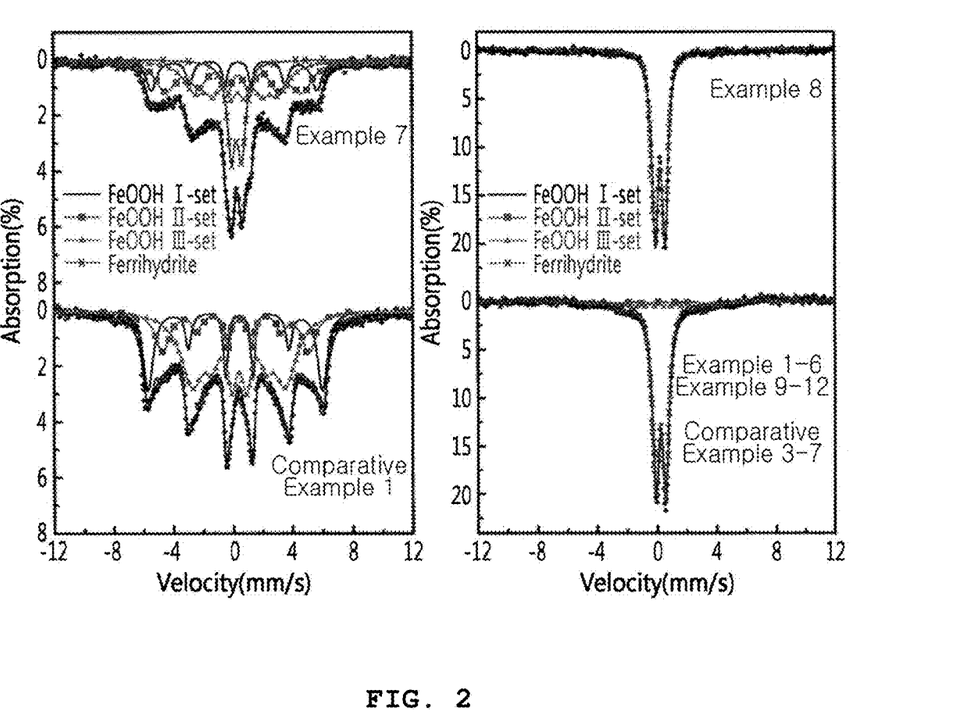
FIG. 2 is a result of analysis of the phase fraction of the first precursor produced in Examples 1 to 12 and Comparative Examples 1 to 7 (Comparative Example 2 is not shown) by Mossbauer spectroscopy.

The phase fractions of the first precursors produced by the methods of Examples 1 to 14 and Comparative Examples 1 to 8 were analyzed by Mossbauer spectroscopy. As a result, the results are shown in FIG. 2, except for the results of Comparative Example 2. Based on the results of the Mossbauer spectroscopy of FIG. 2, the phase fractions are calculated and shown in Table 2 below.

TABLE 2

|  | Phase fraction (%) | |
| --- | --- | --- |
|  | Ferrihydrite | Hematite |
| Examples 1 to 6, Examples 9 to 12, Example 14, and Comparative Examples 3 to 7 | 77% | 23% |
| Example 7 | 19% | 81% |
| Examples 8 and 13, and Comparative Example 8 | 100% | 0% |
| Comparative Example 1 | 0% | 100% |

The phase fraction of the first precursor produced by the method of Comparative Example 2 was the same as that of Comparative Example 1.

When Examples 1 to 14 and Comparative Example 1 were compared in Table 1 and Table 2, in order to produce a catalyst composed of a phase fraction of ferrihydrite:hematite=10 to 100%:0 to 90% with respect to the number of iron atoms contained in each phase as in Examples 1 to 14, it is confirmed that the phase fraction should be ferrihydrite:goethite=10 to 100%:0 to 90% with respect to the number of iron atoms contained in each phase. When the first precursor is composed of goethite 100% as in Comparative Example 1, it can be confirmed that the phase fraction of the catalyst is 100% of the hematite which is out of the optimum value in Table 1. When Examples 1 to 14 and Comparative Examples 3 to 5 were compared in Table 1 and Table 2, in order to produce a catalyst composed of a phase fraction of ferrihydrite: hematite=10 to 100%:0 to 90% with respect to the number of iron atoms contained in each phase as in Examples 1 to 14, it can be confirmed that addition of $SiO_2$ as a structural promoter is essential. It can be confirmed that the phase fraction of the catalyst is 100% of the hematite which is out of the optimum value in Table 1, when $Al_2O_3$ or $ZrO_2$ is added as a structural promoter or when no structural promoter is added as in Comparative Examples 3 to 5 and Comparative Example 8.

Experiment 2: Fischer-Tropsch Synthesis Reaction without Catalytic Reduction Pretreatment and Catalytic Performance Analysis The iron-based catalyst produced by the methods of Examples 1 to 12 and Comparative Examples 1 to 7 was placed in a laboratory-scale fixed bed reactor (amount of catalyst: 0.1 to 1.0 g), without performing a separate reduction pre-treatment on the catalyst, the Fischer-Tropsch synthesis reaction were performed under the conditions of $H_2/CO=1.0$, GHSV=2.8 $NL/g_{(cat)}$-h, temperature=275° C., and pressure=1.5 MPa, and the results of evaluation on the performance of the catalyst are shown in Table 3.

TABLE 3

|  | CO conversion rate (%) | $CO_2$ selectivity (%) | Hydrocarbon distribution (wt %) | | | | | | C5+ Hydrocarbon productivity ($g/g_{(cat)}$-h) |
| --- | --- | --- | --- | --- | --- | --- | --- | --- | --- |
|  |  |  | $CH_4$ | C2-C4 | C5-C11 | C12-C18 | C19+ | Total C5+ |  |
| Example 1 | 67.7 | 41.9 | 6.34 | 15.0 | 18.3 | 17.3 | 43.1 | 78.7 | 0.271 |
| Example 2 | 67.1 | 41.5 | 5.56 | 16.2 | 18.7 | 17.2 | 42.4 | 78.2 | 0.268 |
| Example 3 | 81.2 | 44.8 | 6.33 | 17.1 | 15.6 | 15.8 | 45.3 | 76.6 | 0.290 |
| Example 4 | 58.8 | 36.0 | 3.43 | 9.46 | 15.2 | 16.9 | 55.0 | 87.1 | 0.309 |
| Example 5 | 69.2 | 42.9 | 5.24 | 15.8 | 15.5 | 15.4 | 48.0 | 79.0 | 0.275 |
| Example 6 | 77.4 | 44.6 | 5.30 | 15.5 | 11.0 | 12.8 | 55.5 | 79.2 | 0.288 |
| Example 7 | 73.4 | 41.0 | 3.58 | 10.1 | 12.3 | 16.6 | 57.4 | 86.3 | 0.305 |
| Example 8 | 78.9 | 46.4 | 5.96 | 15.8 | 15.3 | 15.6 | 47.3 | 78.2 | 0.296 |
| Example 9 | 68.2 | 43.4 | 5.28 | 16.0 | 16.0 | 16.5 | 46.3 | 78.8 | 0.261 |
| Example 10 | 64.0 | 44.1 | 5.55 | 16.5 | 17.4 | 16.4 | 44.1 | 78.0 | 0.260 |
| Example 11 | 67.3 | 40.5 | 5.26 | 145.8 | 17.6 | 16.6 | 44.8 | 79.0 | 0.262 |
| Example 12 | 68.1 | 41.1 | 5.23 | 15.5 | 17.9 | 16.5 | 44.9 | 79.3 | 0.274 |
| Example 13 |  |  |  |  |  |  |  |  |  |
| Example 14 | 75.3 | 43.4 | 5.86 | 17.1 | 17.3 | 16.4 | 43.4 | 77.1 | 0.284 |
| Comparative Example 1 | 36.4 | 43.0 | 5.03 | 13.5 | 11.3 | 14.2 | 56.0 | 81.4 | 0.134 |
| Comparative Example 2 | 18.6 | 46.8 | 6.57 | 15.9 | 12.7 | 16.1 | 48.7 | 77.5 | 0.0729 |
| Comparative Example 3 |  |  |  |  |  |  |  |  |  |
| Comparative Example 4 | 6.08 | 17.6 | — | — | — | — | — | — | — |
| Comparative Example 5 | 5.00 | 35.7 | — | — | — | — | — | — | — |
| Comparative Example 6 | 15.6 | 39.7 | 7.04 | 13.0 | 9.40 | 10.6 | 59.9 | 79.9 | 0.0719 |

TABLE 3-continued

|  | CO conversion rate (%) | CO$_2$ selectivity (%) | Hydrocarbon distribution (wt %) | | | | | C5+ Hydrocarbon productivity (g/g$_{(cat)}$-h) |
|---|---|---|---|---|---|---|---|---|
|  |  |  | CH$_4$ | C2-C4 | C5-C11 | C12-C18 | C19+ | Total (C5+) |  |
| Comparative Example 7 | 30.0 | 30.3 | 5.84 | 13.3 | 18.1 | 18.2 | 44.6 | 80.9 | 0.137 |
| Comparative Example 8 |  |  |  |  |  |  |  |  |  |

From the above Table 3, it can be seen that the catalysts produced according to Examples 1 to 12 exhibit significantly higher CO conversion and C$_{5+}$ hydrocarbon productivity than the catalysts produced according to Comparative Examples 1 to 7.

From the results of Comparative Examples 6 and 7 in Table 3, it can be confirmed that excellent catalytic performance cannot be obtained when the content of the structural promoter exceeds the optimum value of Fe:SiO$_2$=100:11-27 by weight ratio.

The iron-based catalyst produced by the methods of Example 1 was placed in a laboratory-scale fixed bed reactor (amount of catalyst: 0.1 to 1.0 g), without performing a separate reduction pre-treatment on the catalyst, the Fischer-Tropsch synthesis reaction were performed under the conditions of H$_2$/CO=2.0, GHSV=4.2 NL/g$_{(cat)}$-h, temperature=275° C., and pressure=1.5 MPa, and the results of evaluation on the performance of the catalyst are shown in Table 4.

TABLE 4

|  | CO conversion (%) | CO$_2$ selectivity (%) | Hydrocarbon distribution (wt %) | | | | | C5+ Hydrocarbon productivity (g/g$_{(cat)}$-h) |
|---|---|---|---|---|---|---|---|---|
|  |  |  | CH$_4$ | C2-C4 | C5-C11 | C12-C18 | C19+ | Total (C5+) |  |
| Example 1 | 70.6 | 26.6 | 1.57 | 6.13 | 8.00 | 16.0 | 68.3 | 92.3 | 0.344 |

The iron-based catalyst produced by the methods of Examples 1 and 7 was placed in a laboratory-scale fixed bed reactor (amount of catalyst: 0.1 to 1.0 g), without performing a separate reduction pre-treatment on the catalyst, the Fischer-Tropsch synthesis reaction were performed under the conditions of H$_2$/CO=1.0, GHSV=5.6 NL/g$_{(cat)}$-h, temperature=275° C., and pressure=3.0 MPa, and the results of evaluation on the performance of the catalyst are shown in Table 5.

TABLE 5

|  | CO conversion (%) | CO$_2$ selectivity (%) | Hydrocarbon distribution (wt %) | | | | | C5+ Hydrocarbon productivity (g/g$_{(cat)}$-h) |
|---|---|---|---|---|---|---|---|---|
|  |  |  | CH$_4$ | C2-C4 | C5-C11 | C12-C18 | C19+ | Total (C5+) |  |
| Example 1 | 66.6 | 41.8 | 3.73 | 11.9 | 16.1 | 20.3 | 48.0 | 84.4 | 0.569 |
| Example 7 | 74.2 | 41.1 | 3.96 | 12.41 | 16.1 | 20.5 | 47.0 | 83.6 | 0.619 |

The iron-based catalyst produced by the methods of Example 7 was placed in a laboratory-scale fixed bed reactor (amount of catalyst: 0.1 to 1.0 g), without performing a separate reduction pre-treatment on the catalyst, the Fischer-Tropsch synthesis reaction were performed under the conditions of H$_2$/CO=1.0, GHSV=11.2 NL/g$_{(cat)}$-h, temperature=275° C., and pressure=3.0 MPa, and the results of evaluation on the performance of the catalyst are shown in Table 6.

TABLE 6

| | CO conversion (%) | $CO_2$ selectivity (%) | Hydrocarbon distribution (wt %) | | | | | C5+ Hydrocarbon productivity ($g/g_{(cat)}$-h) |
|---|---|---|---|---|---|---|---|---|
| | | | $CH_4$ | C2-C4 | C5-C11 | C12-C18 | C19+ | Total | |
| | | | | | C5+ | | | | |
| Example 7 | 41.8 | 38.8 | 3.26 | 13.2 | 9.67 | 13.3 | 60.6 | 83.6 | 0.734 |

The iron-based catalyst produced by the methods of Example 14 was placed in a pilot-scale slurry bubble column reactor (amount of catalyst used: 20 to 200 kg), without performing a separate reduction pre-treatment on the catalyst, the Fischer-Tropsch synthesis reaction were performed under the conditions of $CO_2$ content in the synthesis gas=11%, $H_2/CO$=1.0, GHSV=10 $NL/g_{(cat)}$-h, temperature=275° C., and pressure=1.8 MPa, and the results of evaluation on the performance of the catalyst are shown in Table 7.

TABLE 7

| | CO conversion (%) | $CO_2$ selectivity (%) | Hydrocarbon distribution (wt %) | | | C5+ Hydrocarbon productivity ($g/g_{(cat)}$-h) |
|---|---|---|---|---|---|---|
| | | | $CH_4$ | C2-C4 | C5+ | |
| Example 14 | 79.7 | 34.2 | 6.08 | 12.5 | 81.4 | 0.713 |

The iron-based catalyst produced by the methods of Examples 1, and 3 to 6 was placed in a laboratory-scale fixed bed reactor (amount of catalyst: 0.1 to 1.0 g), and after a separate reduction pre-treatment was performed on the catalyst using a synthesis gas ($H_2$+CO) under the conditions of $H_2/CO$=1.0, GHSV=2.8 $NL/g_{(cat)}$-h, temperature=280° C., pressure=atmospheric pressure, and time=20 h, the results of evaluation on the performance of the catalyst are shown in Table 8.

TABLE 8

| | CO conversion (%) | $CO_2$ selectivity (%) | Hydrocarbon distribution (wt %) | | | | | C5+ Hydrocarbon productivity ($g/g_{(cat)}$-h) |
|---|---|---|---|---|---|---|---|---|
| | | | $CH_4$ | C2-C4 | C5-C11 | C12-C18 | C19+ | Total | |
| | | | | | C5+ | | | | |
| Example 1 | 86.7 | 43.7 | 10.6 | 26.9 | 29.5 | 13.7 | 19.4 | 62.5 | 0.258 |
| Example 3 | 83.9 | 46.2 | 7.77 | 21.3 | 20.4 | 15.6 | 34.9 | 71.0 | 0.264 |
| Example 4 | 77.3 | 44.1 | 12.2 | 26.2 | 33.6 | 14.7 | 13.3 | 61.6 | 0.219 |
| Example 5 | 87.7 | 43.2 | 9.76 | 24.4 | 25.3 | 15.5 | 25.1 | 65.9 | 0.263 |
| Example 6 | 87.9 | 45.1 | 9.58 | 23.9 | 23.0 | 14.1 | 29.4 | 66.6 | 0.268 |

From the above Tables 3 to 8, it can be seen that when the Fischer-Tropsch synthesis reaction is carried out without performing a separate reduction pre-treatment on the iron-based catalysts produced by the methods of Examples 1 and 3 to 6, the CO conversion is slightly lower than that of the case wherein a separate reduction pre-treatment, however, it can be confirmed that the selectivity of $C_{5+}$ hydrocarbons in the hydrocarbons can be significantly increased. As a result, the iron-based catalysts produced by the methods of Examples 1, 3 to 6 exhibited $C_{5+}$ hydrocarbon productivity similar to or somewhat superior to those obtained by performing separate reduction pre-treatment even without performing separate reduction pre-treatment.

That is, as shown in the above Tables 3 to 8, when the Fischer-Tropsch synthesis reaction is carried out using the catalyst of the present invention, it is confirmed that, even without performing separate reduction pre-treatment, a more superior performance can be obtained than that of the case where a separate reduction pre-treatment is performed.

Experiment 3: Analysis of Catalytic Phase Change by Structural Promoter

In order to investigate the effect of the use of the structural promoter on the catalytic phase, the crystal structure of Example 13 which was a catalyst produced according to the present invention and the catalyst of Comparative Example 8 produced without using a structural promoter were analyzed by X-ray diffraction (XRD) using Rigaku DMAX-2500 that uses a Cu Kα light source. Further, XRD analysis was carried out on each of Example 13 and Comparative Example 8 prior to calcining (the first precursor) and after (catalyst).

The results are shown in FIG. 3.

FIG. 3 shows the results of (a) the first precursors of Example 13 and Comparative Example 8, (b) the catalyst of Example 13, and (c) the catalyst of Comparative Example 8.

FIG. 3 shows that the first precursor (a) of Comparative Example 8 exhibited a ferrihydrite pattern before calcining, but exhibited an XRD pattern almost identical to that of hematite as it was made into catalyst (c) after calcining.

Through this, it can be seen that the thermal stability of the ferrihydrite phase is degraded so that it can be easily decomposed into hematite during calcining process.

However, as shown in FIG. 3(b), it can be seen that the ferrihydrite phase is retained in the case of Example 13 using silica as the structural promoter.

Figure 4:
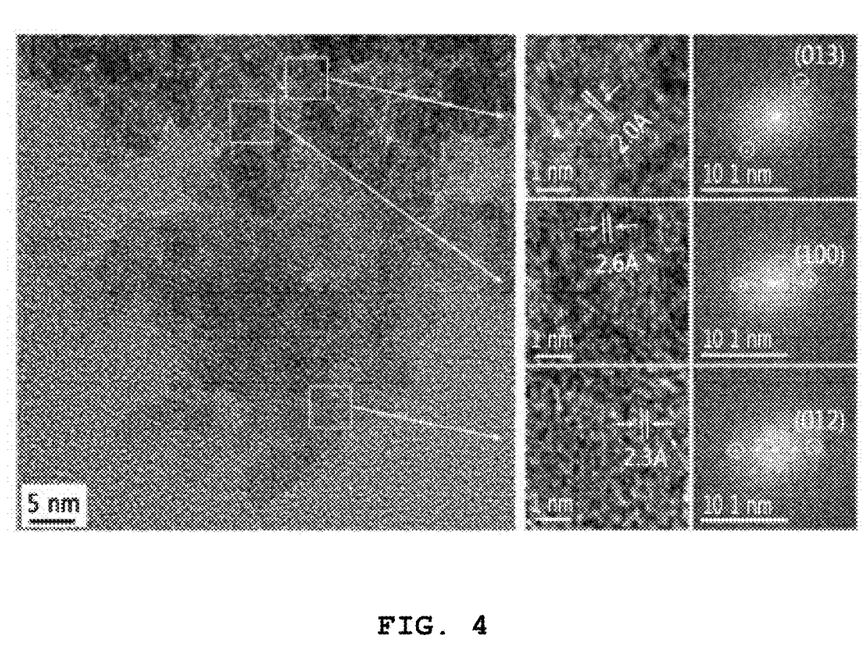
FIG. 4 shows the results of observing the morphology of the catalyst of Example 13 in the high resolution (HR) mode of a transmission electron microscope (TEM) as a catalyst produced according to the present invention.

Further, the shape of the catalyst of Example 13 as a catalyst produced according to the present invention was observed in a high resolution (HRTEM) mode of a transmission electron microscope (TEM), and the results are shown in FIG. 4.

Through FIG. 4, it can be seen that the catalyst produced according to the present invention forms a small crystallite having a size on the order of several nanometers, specifically about 2 to 7 nm.

What is claimed is:

1. A method of producing an activated iron-based catalyst, comprising performing an activation of an iron-based catalyst by synthesis gas at a high pressure of 1 to 3 MPa, without performing a separate activation of an iron-based catalyst by synthesis gas at a low pressure of less than 1 MPa,
wherein the iron-based catalyst includes ferrihydrite and hematite,
wherein the number of iron atoms in the ferrihydrite is from not less than 10% to not more than 100%, and the number of iron atoms in the hematite is from more than 0% to not more than 90% with respect to 100% of the number of iron atoms in the iron-based catalyst,
wherein the iron-based catalyst is made by using silica ($SiO_2$) as the structural promoter and the mass ratio of iron (Fe) to silica ($SiO_2$) in the iron-based catalyst is Fe:$SiO_2$=100:11 to 100:27.

2. The method according to claim 1, wherein the number of iron atoms in the ferrihydrite is 100% with respect to 100% of the number of iron atoms in the iron-based catalyst.

3. The method according to claim 1, wherein the activation is performed in a slurry bubble column reactor.

4. The method according to claim 1, wherein the ferrihydrite is represented by the following Chemical Formula 1:

FeOOH.$n$H$_2$O (0<$n$<1). [Chemical Formula 1]

5. The method according to claim 1, wherein the activation is performed at a temperature of 240 to 300° C. and a space velocity of 2 to 20 NL/g$_{(cat)}$/h.

6. The method according to claim 1, wherein the synthesis gas introduced for the activation has a H$_2$/CO ratio of 0.7 to 2.5 by volume.

7. A method of producing hydrocarbons, comprising performing an activation of an iron-based catalyst by synthesis gas at a high pressure of 1 to 3 MPa, without performing a separate activation of an iron-based catalyst by synthesis gas at a low pressure of less than 1 MPa, and simultaneously performing a Fischer-Tropsch synthesis reaction to produce hydrocarbons which include liquid-phase hydrocarbons,
wherein the iron-based catalyst includes ferrihydrite and hematite,
wherein the number of iron atoms in the ferrihydrite is from not less than 10% to not more than 100%, and the number of iron atoms in the hematite is from more than 0% to not more than 90% with respect to 100% of the number of iron atoms in the iron-based catalyst,
wherein the iron-based catalyst is made by using silica ($SiO_2$) as the structural promoter and the mass ratio of iron (Fe) to silica ($SiO_2$) in the iron-based catalyst is Fe:$SiO_2$=100:11 to 100:27.

8. The method according to claim 7, wherein the number of iron atoms in the ferrihydrite is 100% with respect to 100% of the number of iron atoms in the iron-based catalyst.

9. The method according to claim 7, wherein the activation and the Fischer-Tropsch synthesis reaction are performed in a slurry bubble column reactor.

10. The method according to claim 7, wherein the ferrihydrite is represented by the following Chemical Formula 1:

FeOOH.$n$H$_2$O (0<$n$<1). [Chemical Formula 1]

11. The method according to claim 7, wherein the activation and the Fischer-Tropsch synthesis reaction are performed at a temperature of 240 to 300° C. and a space velocity of 2 to 20 NL/g$_{(cat)}$/h.

12. The method according to claim 7, wherein the synthesis gas introduced for the activation and the Fischer-Tropsch synthesis reaction has a H$_2$/CO ratio of 0.7 to 2.5 by volume.

* * * * *